United States Patent [19]
Chiotis et al.

[11] Patent Number: 5,886,111
[45] Date of Patent: Mar. 23, 1999

[54] SILICONE SEALING MATERIAL EXHIBITING HIGH STRESS RELAXATION

[75] Inventors: Achilles Chiotis, Mountain View; Janusz Wójtowicz, Palo Alto, both of Calif.

[73] Assignee: Raychem Corporation, Menlo Park, Calif.

[21] Appl. No.: 809,519

[22] PCT Filed: Sep. 21, 1995

[86] PCT No.: PCT/US95/11970

§ 371 Date: Mar. 24, 1997

§ 102(e) Date: Mar. 24, 1997

[87] PCT Pub. No.: WO96/10608

PCT Pub. Date: Apr. 11, 1996

Related U.S. Application Data

[63] Continuation-in-part of Ser. No. 316,682, Sep. 30, 1994, abandoned.

[51] Int. Cl.$^6$ .................. C08F 283/00; C08F 283/02; C08G 77/04; C08G 77/06
[52] U.S. Cl. .................. 525/478; 525/106; 525/464; 525/474; 525/477; 528/15; 528/25; 528/26; 528/27
[58] Field of Search .................. 525/106, 464, 525/474, 477, 478; 528/15, 25, 26, 27

[56] References Cited

U.S. PATENT DOCUMENTS

| | | | |
|---|---|---|---|
| 3,060,260 | 2/1962 | Nelson | 260/46.5 |
| 3,957,713 | 5/1976 | Jeram et al. | 260/32.8 SB |
| 4,072,635 | 2/1978 | Jeram | 260/2.5 S |
| 4,340,710 | 7/1982 | Brown, Jr. | 58/14 |
| 4,490,500 | 12/1984 | Smith | 524/378 |
| 4,595,635 | 6/1986 | Dubrow et al. | 428/447 |
| 4,600,261 | 7/1986 | Debbaut | 339/116 C |
| 4,634,207 | 1/1987 | Debbaut | 339/116 C |
| 4,680,233 | 7/1987 | Camin et al. | 428/424.6 |
| 4,777,063 | 10/1988 | Dubrow et al. | 427/44 |
| 4,852,646 | 8/1989 | Dittmer et al. | 165/185 |
| 4,864,725 | 9/1989 | Debbaut | 29/871 |
| 5,079,300 | 1/1992 | Debrow et al. | 525/106 |
| 5,140,746 | 8/1992 | Debbaut | 29/855 |
| 5,229,058 | 7/1993 | Uken et al. | 264/261 |
| 5,286,516 | 2/1994 | Uken | 427/58 |
| 5,357,057 | 10/1994 | Debbaut | 174/84 R |
| 5,466,532 | 11/1995 | Wengrovius et al. | 428/447 |
| 5,525,073 | 6/1996 | Sampson | 439/521 |
| 5,529,508 | 6/1996 | Chiotis et al. | 439/204 |

*Primary Examiner*—James C. Housel
*Assistant Examiner*—Rodney P. Swartz
*Attorney, Agent, or Firm*—Yuan Chao; Herbert G. Burkard

[57] ABSTRACT

A silicone gel formulation is described having a Voland hardness of from about 6 to 20 grams, a tack of from about 17 to 35 grams, and a stress relaxation greater than 50%. The material is especially suitable for sealing the back end of connectors containing a multiple fine wires with gauges between about 14 gauge and 28 gauge. It is particularly suitable to seal the back end of an automotive connector subjected to a wide variety of harsh environmental conditions.

14 Claims, No Drawings

SILICONE SEALING MATERIAL EXHIBITING HIGH STRESS RELAXATION

CROSS-REFERENCE TO RELATED APPLICATIONS

This application is the US national stage of international application no. PCT/US95/11970, filed Sep. 21, 1995, which is a continuation-in-part of U.S. application Ser. No. 08/316,682, filed Sep. 30, 1994, now abandoned the disclosures of which are incorporated herein by reference.

TECHNICAL FIELD OF THE INVENTION

This invention relates to gel sealing materials. More specifically this invention relates to a silicone gel sealing material having a high stress relaxation which enables it to effectively seal two wires entering the back end of a twin wire connector.

BACKGROUND OF THE INVENTION

Permanently sealing wires in the back end of the connector can be accomplished with epoxies or other fast curing adhesives. However, differences in thermal expansion properties of the adhesive and the wire jacket may cause hair line cracks or fractures which would permit moisture to enter the connector and cause corrosion. Sealing wires entering a connector where reentry is necessary creates additional problems. Mastics or greases can be used but these are messy and/or flow at higher temperatures.

Effective sealing where reentry is a requirement or desirable has been achieved through the use of gel sealing materials as described in U.S. Pat. Nos., 4,600,261; 4,680,233; 4,777,063 and 5,079,300. All these preceding patents are completely incorporated herein by reference for all purposes. These gel sealing materials are cross-linked polymer solids extended with a non reactive fluid extender. Alternatively, the gels may be a cross-linked system which includes an excess of a reactive fluid such as the vinyl group material so that it acts like an extender as exemplified by Sylgard 527® and as taught in U.S. Pat. No. 3,020,260, the disclosure of which is incorporated herein by reference for all purposes.

The gel material is a substantially dilute system which exhibits no steady state flow. As discussed by Ferry, a polymer gel is then a cross-linked solution whether linked by chemical bonds or crystallites or some other kind of junction. The absence of the steady state flow is the key definition of the solid like properties while the substantial dilution is necessary to give the relatively low modulus of gels. The solid nature is achieved by a microscopically continuous network structure formed in the material generally through crosslinking the polymer chains through some kind of junction or the creation of domains of associated substituents of various branch chains of the polymer. The crosslinking can be either physical or chemical as long as the crosslink sites are sustained at the use conditions of the gel.

Gels produced by mixing styrenic triblock copolymers such as styrene-ethylenebutylene-styrene (SEBS) and styrene-ethylene propylene-styrene (SEPS) etc. and parafinic oils are comprised of glassy styrenic micropheres interconnected by a fluid extended elastomeric phase. The microphase separated styrenic domains serve as the junction points in the systems. The SEBS and SEPS gels are examples of thermoplastic systems. Whereas, silicone gels of the present invention are examples of thermoset gels. This class of gels is chemically cross-linked through the use of a multifunctional cross linking agent.

Although the silicone gels described in the above referenced patents and brochures have been shown to effectively seal a wide variety of articles, difficulties often arise when trying to seal two fine wires generally in the gauge found in automotive connectors where the wires are located in close proximity such as the back end of a connector. Thus, it would be highly desirable to have the benefits and ease of use of a gel sealing material with preferred sealing characteristics for use with twin or multiple wires in for example an automotive connector wherein the gauges of wires are between 18 and 26 gauge wire.

SUMMARY OF THE INVENTION

The invention provides for the previously cited desirable features as well as many other advantages obvious to the ordinary skilled artisan. More specifically, it has been discovered that a silicone gel having a stress relaxation greater than about 50% provides an effective gel sealant for twin or multi-wire applications for example in the back end of automotive connectors. In particular, the gel sealing material should also have a Voland hardness of from about 6 grams to about 20 grams, a tack of from about 17 grams to about 35 grams, and a stress relaxation greater than 45% and approaching 95%. Additionally the invention provides for a connector having a plurality of wires entering therein and sealed with the composition of the invention. The connector design should exert an initial pressure on the gel greater than about 5 psi, preferably greater then about 15 psi, and most preferably greater than about 25 psi.

DESCRIPTION OF THE PREFERRED EMBODIMENTS

A preferred gel sealing material for sealing close proximity twin or multiple wires entering the back end of a connector such as an automotive connector is an organopolysiloxane composition. The appropriate stress relaxation properties can be achieved by at least two paths, namely the addition of fillers such as zinc oxide (ZnO) or like filler material to a Raychem gel known as T-894. The filler material is present in an amount of greater than 5% but less than about 20% and preferably from about 10% to about 20%, more preferably about 7.5 to 15% and most preferably 10 to 13%. It was quite unexpected that a material having the desired stress relaxation properties but similar properties in terms of hardness and tack to the non-filled materials could be achieved through the use of the additive. Other suitable added fillers might be barium oxide, Al(OH)3, $TiO_2$, and like other oxides. A preferred range of Voland hardness is from about 6 grams to about 20 grams, a tack of from about 17 grams to about 35 grams. Additionally, the elongation of the gel is greater than about 200% and preferably greater than bout 400% most preferably greater than about 750%. More generally, the higher the elongation without sacrificing the stress relaxation and other properties, the better. Alternatively, the appropriately stress relaxed material can be made without fillers by adjusting the starting components. The elongation is measured according to the procedures of ASTM D638.

The Voland hardness, stress relaxation, and tack are measured using a Voland-Stevens texture analyzer model LFRA or like machines having a 5,000 gram load cell, a 5 gram trigger, and ¼ inch (6.35mm) ball probe as described in U.S. Pat. No. 5,079,300, the disclosure of which is completely incorporated herein by reference for all purposes. For example measuring the hardness of a gel a 20ml glass scintillating vile with about 10 grams but 13 grams is preferred of gel is placed in the Stevens-Voland texture analyzer and the stainless steel probe ball is forced into the gel at the speed of 0.2 mm per second a penetration distance of about 4.0 mm. The Voland hardness of the gel is the force in grams required to force the ball probe at that speed to penetrate or deform the surface of the gel specified for 4.0 mm. Higher numbers signify harder gels.

The tack and stress relaxation are read from the stress curve generated by the recorder. When the recorder is on it automatically traces the force versus time curve experienced by the load cell. The penetration and withdrawal speed is 2.0 mm/sec with a chart speed of 5 cm/second. The tack is the amount of force in grams resisting on the probe as it is pulled out of the gel. The units of force depend upon the millivolt setting selected. A 2 millivolt setting corresponds to a 100 grams at full scale. 5 millivolts is 250 grams at full scale and so on. The chart width is 25 cm. Force units are determined by dividing the calibration weight at the appropriate V setting by 25 cm. For example if the recorder is calibrated at 100 grams full scale then multiply the measured value in centimeters by a factor of 4, i.e. (100 g/25 cm) to determine hardness while tack and stress relaxation are measured from the chart paper.

With respect to overall distance of movement the 4 mm distance is measured from the moment, probe senses 5 g force applied to it (5 g trigger point). If softer gel is tested, the probe may penetrate the gel to the initial depth of about 2 mm before it detects 5 grams. Once the trigger point is reached a 4 mm distance is measured. As you can see Δtotal depth can be different than 4 mm. The stress relaxation is the ratio of the initial force ($F_i$) (also kown as peak force (H))resisting the probe at a pre-set penetration depth minus the force resisting the probe ($F_f$) after 1 min (also known as equilibrium force (L)) divided by $F_i$. More specifically, percent stress relaxation is equal to $(F_i-F_f)/F_i \times 100$ where $F_i$ and $F_f$ are gms read in the chart in cm. and where tack T equals TΔ×Factor for TΔ equals mm, read in the chart time factor, e.g. 4 g/cm at 2 mV, 10 g/cm at 5 mV and 20 g/cm at 10 mV. In other words the stress relaxation is the ratio of the initial force minus the force after a minute over the initial force. It is a measure of the ability of the gel in essence to relax any induced compression placed on the gel by the initial installation of the wires and/or testing of the material. More specifically, hardness is equal to the peak force recorded by the probe. Tack is the adhesive force between the gel and the probe upon withdrawal. Stress relaxation is a ratio of difference between peak force (H) and the equilibrium force (L) after sixty seconds, to the peak force $((H-L)/H) \times 100\%$.

The high stress relaxation gel is generally fabricated by a two part precursor system of a part A which comprises about 72% 1,000 centistoke polydimethylsiloxane fluid material as a diluent/extender about 0.20% parts tetrafunctional vinyl terminated of inhibitor about 0.200% platinum vinyl terminated polydimethylsiloxane complex catalyst and about 27.5% of a 170 KCS non-reactive divinyl-terminated PDMS. The part B is about 72% of a material similar to first part in Part A. About 0.1% of a tetrafunctional hydride terminated crosslinker and about 27.5% of 170 KCS divinyl PDMS polymer. Suitable materials are available from places such as Dow, GE, Union Carbide, Hulls, Nusil, etc. Preferred vinyls and catalysts are CAT-50, PC075, Ply 7520, RTV 633.

These parts are then mixed together such that the final composition is about from 7.5% to about 20% ZnO with the rest being the combination of parts A and B and preferably about 10 to 13% ZnO with the rest being the silicone.

Alternatively, the high stress relaxation material can be achieved through the direct adjustment of the initial materials in the absence of a filler. This is particularly preferred solution because the filler may not always uniformly mix throughout the material thus giving a variation of properties whereas a material in the absence of filler is more apt to have uniform properties throughout.

Components of a directly mixed material will utilize a poly(dimethylsiloxane) trimethylsiloxy terminated diluent in the amount of from about 30 to 70 wt. %. The diluent preferably has viscosity of between 25 to 2,000 centistokes. The active vinyl group is a divinyl terminated poly (dimethylsiloxane) siloxane having a viscosity of from about 10,000 to about 500,000 centistokes and is present in the amount from about 70 to about 30 wt %. About 3 to 20 parts/million platinum catalyst is utilized and depending upon the cure rate an inhibitor of from 0 to 250 parts is utilized and multi-functional crosslinker of from about 0.6% to about 0.65% to provide a gel having hardness 6–20 g, tack 17–35 g. and stress relaxation 45–95%.

More preferably, the non-filled material is a divinyl terminated poly(dimethylsiloxane) having a viscosity of from about 50 to 175 thousand centistokes and is present in about 30 to 70 wt % in a diluent of from about 40 to 1000 centistokes is present from about 70 to 30 wt %. The platinum catalyst is from about 5 to 15 ppm with an inhibitor of from about 50 to 100 ppm and tetrafunctional crosslinker in the amount of from about 0.62% to 0.63% to provide a gel having hardness 7–16 g. tack 20–35 g, and stress relaxation 50–80%.

A particularly preferred composition is about 45% divinyl terminated poly(dimethylsiloxane) having viscosity of from about 72,000 to about 90,000, a poly(dimethylsiloxane) trimethyl siloxy terminated diluent having a viscosity of from about 45 to about 55 centistokes and present in the amount of about 55%, about 0.3 wt % platinum catalyst about 0.6 wt % crosslinker and an inhibitor of about 0.15 wt %. This particularly preferred material produces a gel having a hardness between about 8 and 12 grams with a tack of 25 to 30 grams while exhibiting a stress relaxation of 65 to 75%.

The compositions of the invention are utilized by mixing the parts A and B together and filling the back end of connector and permitting the items to cure. Thereafter upon use fine gauge wires such as automotive wires having a gauge between about 14 and 28 are inserted through the gel into the back of the connector and effectively sealed therein. In the absence of a high stress relaxation material, the sealing between the wires which touch or almost touch is a problem because of what is known as tenting or triangulation leak paths which occur at the interface between the wires.

An example of a particularly suitable connector appropriately modified for sealing twin wires in close proximity is disclosed in SEALING MEMBER U.S. Ser. No. 08/221,728 filed Apr. 1, 1994, the disclosure of which is completely incorporated herein by reference for all purposes. The most preferred configuration is a gel layer of from about 3.0 to about 6.0 mm thick sandwiched between two layers of reticulate about 1.5 mm thick. The recticle layers may be polyurethane. The recticulate layers are to ease handling of the sealing gel. This structure can seal wires with many different insulation jackets such as polyethylene, PVC, Kynar®, polyester, and the like. The initial closing pressures of at least about 5 psi, preferably 15 psi, and most preferably 25 psi ensure an adequate wire seal. Thereafter, the high stress relaxation permits the pressured gel to sealing assume and retain contact with the wires in the connector.

The invention will be particularly illustrated by the following embodiment examples.

EXAMPLES

| Ingredient | Example 1 | Example 2 | Example 3 | Example 4 | Example 5 | Example 6 |
|---|---|---|---|---|---|---|
| T-894 | 94.7 | 94.7 | 89.7 | 88.7 | 87.7 | 86.7 |
| ZnO | 5 | 5 | 10 | 11 | 12 | 13 |
| Blue CC | 0.3 | 0.3 | 0.3 | 0.3 | 0.3 | 0.3 |
| Physical Properties | | | | | | |
| Vh | 21 | 17 | 12 | 10 | 9 | 8 |
| S.R. | 36 | 40 | 50 | 22 | 59 | 61 |
| Tack | 38 | 36 | 34 | 35 | 23 | 28 |

T-894 is a two part polyorganosiloxane gel material. 100 gram portions of part A and part B were mixed together. Part A comprises about 72.4 grams of a 1000cs polydimethylsiloxane fluid, 0.1 grams of a tetrafunctional hydride terminated crosslinker, and about 27.5 grams of a 170 KCS divinyl terminated polydimethylsiloxane. Part B includes substantially like amounts of diluent fluid and divinyl without the hydride crosslinker, but also includes about 0.02 grams tetrafunctional vinyl terminated inhibitor and 0.1 grams platinum/vinyl terminated polydimethylsiloxane catalyst complex.

These materials were mixed together in equal parts along with the ZnO and blue coloring and placed in the back of an automotive connector and permitted to cure. The formulations of Examples 1–6 were tested in a 10 way 18 gauge wire automotive connector. The materials of Examples 3,5, and 6 effectively sealed the connector through a series of thermocycling ranging from −40° C. to +125° C. followed by a water emersion whereas low stress relaxation formulations of Examples 1, 2, and 4 failed the test.

EXAMPLE 7

This example is based upon weight percent. About 45 wt % of a 90 KCS divinyl terminated polydimethylsiloxane RTV633 was mixed with about 55 wt % of a 50 centistoke (polydimethylsiloxane) trimethylsiloxy terminated diluent Amersil L45 about 0.029 wt. % of divinyltetramethylsiloxane platinum catalyst PC75 about 0.63 wt % tetrafunctional hydride terminated crosslinker UCT-1915 and about 0.15 wt % inhibitor 1, 3, 5, 7 tetravinylmethylcyclotetrasiloxane T2160. The material had a hardness of from about 8 to 12 grams, a tack 25 to 35 grams, and a stress relaxation in the order of about 65 to about 75%. The composition provided an effective sealing material for a multiple wire connector.

While the invention has been described with respect to particularly preferred embodiments. Modifications which would be obvious to one of ordinary skill in the art such as alternative formulations to achieve the desired hardness tack and stress relaxation properties are contemplated to be within the scope of the invention.

What is claimed is:

1. A sealing composition comprising: divinylterminated dimethylsiloxane having a viscosity of from about 10,000 to about 500,000 centistokes, a non-reactive poly (dimethysiloxane) diluent having a viscosity of from about 250 to 2,000 centistokes, a platinum catalyst in an amount of 3 to 20 parts per million and 0 to about 250 parts per million inhibitor and a multi-functional crosslinker in the amount of from about 0.6% to about 0.65%; the final composition further including a filler in an amount of from 10% to 20% of the composition and having a hardness of from about 6 to 20 grams, a tack of from about 17 to 35 grams and a stress relaxation of from about 45% to 90%.

2. The composition according to claim 1 wherein the divinylterminated poly(dimethysilyoxane) has a viscosity from about 50,000 to about 175,000 centistokes, the diluent is present in an amount from 30 to 70 wt % and has a viscosity from about 40 to 1,000 centistokes, platinum catalyst is present from about 5 to 15 ppm, and the composition further includes about 50 to 100 ppm inhibitor and 0.62% to 0.63% tetrafunctional crosslinker.

3. The composition according to claim 2 wherein the diluent is a poly(dimethysiloxane) trimethylsiloxyterminated fluid, the catalyst is a divinyl-tetramethylsiloxane platinum containing catalyst, and the inhibitor is 1, 3, 5, 7-tetravinyltetramethylcyclotetrasiloxane and tetrafunctional crosslinker in an amount about 0.63% so that the gel has a hardness of from about 8 to 12 grams, a tack of 25 to 35 grams with a stress relaxation of from about 65 to 75%.

4. The composition according to claim 3 wherein the composition is cured in a multiple wire connector.

5. An automotive connector comprising a back portion into which multiple wires enter therein and a front portion capable of mating with a connector, the back end portion of the connector containing an effective sealing amount of a polyorganosiloxane gel including a filler in an amount of about 10% to about 20% of the gel and having a Voland hardness of from about 6 to 20 grams, a tack of from about 17 to 35 grams and a stress relaxation of from about 45% to 95%.

6. The connector according to claim 5 wherein the stress relaxation is greater than 50%.

7. The connector according to claim 5 wherein the gel includes from about 10% to about 20% filler.

8. The connector according to claim 6 wherein the gel is a layer about 3 to about 6 mm thick sandwiched between reticulate layers about 1.5 mm thick.

9. The connector according to claim 7 wherein the gel is a layer about 3 to about 6 mm thick sandwiched between reticulate layers about 1.5 mm thick.

10. The connector according to claim 5, wherein the gel includes from about 7.5 to 15% filler.

11. The connector according to claim 7, wherein the reticulate is a polyurethane reticulate.

12. The connector according to claim 8, wherein the reticulate is a polyurethane reticulate.

13. A sealing composition according to claim 1, wherein the filler is selected from the group consisting of zinc oxide, barium oxide, $Al(OH)_3$ and $TiO_2$.

14. An automotive connector according to claim 5, wherein the filler is selected from the group consisting of zinc oxide, barium oxide, $Al(OH)_3$ and $TiO_2$.

* * * * *